(12) United States Patent
Kim et al.

(10) Patent No.: US 8,976,731 B2
(45) Date of Patent: Mar. 10, 2015

(54) BASE STATION, MOBILE STATION, PAGING MESSAGE TRANSMITTING METHOD, AND PAGING MESSAGE RECEIVING METHOD

(75) Inventors: Eunkyung Kim, Daejeon (KR); Soojung Jung, Daejeon (KR); Jae Sun Cha, Daejeon (KR); Sung Cheol Chang, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 126 days.

(21) Appl. No.: 13/695,283

(22) PCT Filed: Apr. 29, 2011

(86) PCT No.: PCT/KR2011/003182
§ 371 (c)(1),
(2), (4) Date: Oct. 29, 2012

(87) PCT Pub. No.: WO2011/136599
PCT Pub. Date: Nov. 3, 2011

(65) Prior Publication Data
US 2013/0039255 A1 Feb. 14, 2013

(30) Foreign Application Priority Data

Apr. 30, 2010 (KR) .................. 10-2010-0040480
Apr. 27, 2011 (KR) .................. 10-2011-0039682

(51) Int. Cl.
*H04W 4/00* (2009.01)
*H04W 4/06* (2009.01)
*H04W 68/00* (2009.01)
*H04W 72/00* (2009.01)

(52) U.S. Cl.
CPC ............... *H04W 4/06* (2013.01); *H04W 68/00* (2013.01); *H04W 72/005* (2013.01)
USPC ........................................................ 370/328

(58) Field of Classification Search
None
See application file for complete search history.

(56) References Cited

U.S. PATENT DOCUMENTS

| | | | |
|---|---|---|---|
| 2003/0088695 A1 | 5/2003 | Kwak et al. | |
| 2003/0223394 A1* | 12/2003 | Parantainen et al. | 370/336 |
| 2008/0192675 A1* | 8/2008 | Kim et al. | 370/320 |
| 2008/0232293 A1 | 9/2008 | Mooney et al. | |
| 2008/0268878 A1* | 10/2008 | Wang et al. | 455/458 |
| 2009/0046637 A1* | 2/2009 | Kim et al. | 370/329 |
| 2009/0109890 A1* | 4/2009 | Chow et al. | 370/312 |
| 2009/0280848 A1 | 11/2009 | Park et al. | |

(Continued)

FOREIGN PATENT DOCUMENTS

| | | | |
|---|---|---|---|
| KR | 10-2003-0032780 A | 4/2003 | |
| KR | 10-2009-0037702 A | 4/2009 | |

(Continued)

*Primary Examiner* — Anh-Vu Ly
(74) *Attorney, Agent, or Firm* — Rabin & Berdo, P.C.

(57) ABSTRACT

A method for a base station supporting multicarrier operation to transmit a paging message is provided. The base station determines a first time point for multicast broadcast service (MBS)-related information and transmits the MBS-related information through a first carrier at the first time point. Also, the base station determines a second time point for transmitting a paging message to a mobile station, determines a second carrier for transmitting the paging message to the mobile station, and transmits the paging message through the second carrier at the second time point. Here, the second time point is different from the first time point.

19 Claims, 12 Drawing Sheets

(56) References Cited

U.S. PATENT DOCUMENTS

| | | | |
|---|---|---|---|
| 2010/0080159 A1* | 4/2010 | Hu et al. | 370/312 |
| 2010/0157969 A1* | 6/2010 | Swamy et al. | 370/343 |
| 2010/0248753 A1* | 9/2010 | Kwak et al. | 455/458 |
| 2011/0159905 A1* | 6/2011 | Zheng | 455/509 |
| 2011/0182229 A1* | 7/2011 | Park et al. | 370/312 |
| 2011/0243056 A1* | 10/2011 | Jen | 370/312 |
| 2011/0261712 A1* | 10/2011 | Park et al. | 370/252 |
| 2011/0292856 A1 | 12/2011 | Park et al. | |
| 2012/0207073 A1* | 8/2012 | Kim et al. | 370/311 |
| 2012/0224523 A1* | 9/2012 | Reznik et al. | 370/312 |
| 2013/0058280 A1* | 3/2013 | Kim et al. | 370/328 |
| 2013/0136014 A1* | 5/2013 | Lee et al. | 370/252 |

FOREIGN PATENT DOCUMENTS

| | | |
|---|---|---|
| KR | 10-2009-0117572 A | 11/2009 |
| KR | 10-2010-0014466 A | 2/2010 |
| KR | 10-2010-0042209 A | 4/2010 |

* cited by examiner

BASE STATION, MOBILE STATION, PAGING MESSAGE TRANSMITTING METHOD, AND PAGING MESSAGE RECEIVING METHOD

TECHNICAL FIELD

The present invention relates to a base station and a mobile station. Particularly, the present invention relates to a paging message transmitting method of the base station and a paging message receiving method of the mobile station.

BACKGROUND ART

A base station supporting multicarrier operation can transmit a paging-related message and a multicast broadcast service (MBS) through different carriers.

A mobile station in an idle mode may be placed in a situation of receiving a paging-related message on the way of receiving an MBS.

When having one transceiver, the mobile station has a need to use a carrier switch to receive the paging-related message.

However, when an MBS is transmitted in a paging listening interval, the mobile station may not normally receive the MBS.

DISCLOSURE

Technical Problem

The present invention has been made in an effort to provide a method having advantages for a mobile station in an idle mode to normally receive a multicast broadcast service while receiving a paging-related message in a mobile communication system supporting multicarrier operation.

Technical Solution

An embodiment of the present invention provides a method for a base station supporting multicarrier operation to transmit a paging message. The method includes: determining a first time point for transmitting multicast broadcast service (MBS)-related information; transmitting the MBS-related information through a first carrier at the first time point; determining a second time point for transmitting a paging message; determining a second carrier for transmitting the paging message to a mobile station; and transmitting the paging message through the second carrier at the second time point, wherein the second time point is different from the first time point.

The determining of a second carrier may include determining the first carrier as the second carrier when the mobile station receives the MBS-related information.

The determining of a second time point may include determining a predetermined and fixed time point as the second time point when the mobile station receives the MBS-related information.

The determining of a second carrier may further include determining the second carrier based on a deregistration identifier allocated to the mobile station and a number of paging carriers included in a paging group allocated to the mobile station when the mobile station does not receive the MBS-related information.

The determining of a second time point may further include determining a superframe number based on a paging cycle allocated to the mobile station and a paging offset allocated to the mobile station when the mobile station does not receive the MBS-related information, determining a frame number based on the deregistration identifier allocated to the mobile station and a time domain hash parameter allocated to the mobile station, and determining the second time point based on the superframe number and the frame number.

The first carrier may correspond to an MBS dedicated carrier, and the MBS dedicated carrier may be divided into a multicast region corresponding to the first time point and a unicast region corresponding to the second time point.

The determining of a second time point may include determining a time point as the second time point when the mobile station receives the MBS-related information. Also, the method may further include transmitting information on the second time point to the mobile station.

In addition, the method may further include: determining a third time point for transmitting a paging group information message; determining a third carrier for transmitting the paging group information message; and transmitting the paging group information message through the third carrier at the third time point, wherein the third time point is different from the first time point.

The determining of a third carrier may include determining the first carrier as the third carrier when the mobile station receives the MBS-related information, and the determining of a third time point include determining the second time point as the third time point when the mobile station receives the MBS-related information.

Another embodiment of the present invention provides a method for receiving a paging message by a mobile station supporting multicarrier operation. The method includes: receiving multicast broadcast service (MBS)-related information at a first time point of a first carrier; determining a second time point for receiving a paging message; determining a second carrier for receiving the paging message; and receiving the paging message through the second carrier at the second time point, wherein the second time point is different from the first time point.

The determining of a second carrier may include determining the first carrier as the second carrier when the mobile station receives the MBS-related information.

The first carrier may correspond to a MBS dedicated carrier and the MBS dedicated carrier may be divided to a multicast region corresponding to the first time point and a unicast region corresponding to the second time point.

The determining of a second time point may include determining a paging listening interval based on a paging cycle allocated to the mobile station and a paging offset allocated to the mobile station when the mobile station does not receive the MBS-related information, and determining an interval of the unicast region as the second time point. In addition, the receiving of a paging message may include receiving the paging message after waiting the interval of the unicast region when the paging listening interval is identical to the interval of the unicast region.

The determining of a second carrier further may include determining the second carrier based on a deregistration identifier allocated to the mobile station and a number of paging carriers included in a paging group allocated to the mobile station when the mobile station does not receive the MBS-related information. In addition, the determining of a second time point may include determining a superframe number based on a paging cycle allocated to the mobile station and a paging offset allocated to the mobile station when the mobile station does not receive the MBS-related information, determining a frame number based on the deregistration identifier allocated to the mobile station and a time domain hash parameter allocated to the mobile station, and determining the second time point based on the superframe number and the frame number.

Yet another embodiment of the present invention provides a base station supporting multicarrier operation. The base station includes: a multicast broadcast service (MBS) transmitter for transmitting an MBS through at least one MBS transmitting carrier; a paging transmission time point determining unit for determining a time point excluding a time point for transmitting a part or all of at least one MBS as a paging message transmission time point for a mobile station; a paging transmission carrier determining unit for determining a paging message transmission carrier for the mobile station; and a paging transmitter for transmitting the paging message through the paging message transmission carrier at the paging message transmission time point to the mobile station.

The base station may further include a receiver for receiving information on a MBS in which the mobile station is interested from the mobile station, wherein the paging transmission carrier determining unit may determine the interested MBS transmission carrier as the paging message transmission carrier.

In addition, the interested MBS transmission carrier may be divided into a multicast region and a unicast region, and the paging transmission time point determining unit may determine an interval of the unicast region as the paging message transmission time point.

The base station may further include a receiver for receiving information on an MBS in which the mobile station is interested from the mobile station, wherein the paging transmission time point determining unit may determine a time point excluding a time point for transmitting the MBS in which the mobile station is interested as the paging message transmission time point.

Yet another embodiment of the present invention provides a mobile station supporting multicarrier operation. The mobile station includes: a multicast broadcast service (MBS) receiver for receiving an MBS at a first time point of a first carrier; a paging receiving interval determining unit for determining a second time point for receiving a paging message; a paging transmission carrier determining unit for determining a second carrier for receiving the paging message; and a paging receiver for receiving the paging message through the second carrier at the second time point, wherein the second time point is different from the first time point.

The mobile station may further include an MBS carrier information transmitter for transmitting information on the first carrier to the mobile station, wherein the paging transmission carrier determining unit may determine the first carrier as the second carrier.

The mobile station may further include an MBS information transmitter for transmitting information on the MBS to the mobile station.

Yet another embodiment of the present invention provides a method for a base station to transmit a paging message, the method including: allocating a paging group to a mobile station; selecting one among at least one paging carrier included in the paging group allocated to the mobile station as a paging transmission carrier for the mobile station based on a number of the at least one paging carrier included in the paging group allocated to the mobile station when the mobile station does not receive an MBS; selecting an MBS receiving carrier for the mobile station as the paging transmission carrier for the mobile station when the mobile station receives an MBS; and transmitting the paging message through the paging transmission carrier.

The method may further include allocating a deregistration identifier to the mobile station, wherein the selecting of one among at least one paging carrier may include selecting one among at least one paging carrier included in the paging group allocated to the mobile station as the paging transmission carrier for the mobile station based on the deregistration identifier allocated to the mobile station, and the selecting of an MBS receiving carrier for the mobile station may include selecting the MBS receiving carrier for the mobile station as the paging transmission carrier for the mobile station without considering the number of the at least one paging carrier included to the paging group allocated to the mobile station and the deregistration identifier allocated to the mobile station.

The selecting of one among at least one paging carrier may include selecting one among at least one paging carrier included in the paging group allocated to the mobile station as the paging transmission carrier for the mobile station based on a remainder obtained by dividing the deregistration identifier allocated to the mobile station by the number of the at least one paging carrier included to the paging group allocated to the mobile station.

The method may further include transmitting a control message including information on a number of paging carriers for each of a plurality of paging groups to the mobile station.

Yet another embodiment of the present invention provides a method for a mobile station to receive a paging message. The method includes: receiving information on a paging group from a base station; selecting one among at least one paging carrier included in a paging group allocated to the mobile station as a paging transmission carrier for the mobile station based on a number of at least one paging carrier included in the paging group when the mobile station does not receive a multicast broadcast service (MBS); selecting an MBS receiving carrier for the mobile station as the paging transmission carrier for the mobile station when the mobile station receives an MBS; and monitoring the paging message through the paging transmission carrier.

The method may further include receiving allocating information on a deregistration identifier from the base station, wherein the selecting of one among at least one paging carrier may include selecting one among at least one paging carrier included in the paging group allocated to the mobile station as the paging transmission carrier for the mobile station based on the deregistration identifier allocated to the mobile station, and the selecting of an MBS receiving carrier for the mobile station may include selecting the MBS receiving carrier for the mobile station as the paging transmission carrier for the mobile station without considering the number of the at least one paging carrier included in the paging group allocated to the mobile station and the deregistration identifier allocated to the mobile station.

Meanwhile, the selecting of one among at least one paging carrier may include selecting one among at least one paging carrier included in the paging group allocated to the mobile station as the paging transmission carrier for the mobile station based on a remainder obtained by dividing the deregistration identifier allocated to the mobile station by the number of the at least one paging carrier included to the paging group allocated to the mobile station.

The method may further include receiving a control message including information on a number of paging carriers for each of a plurality of paging groups from the base station.

Advantageous Effects

According to embodiments of the present invention, a mobile station supporting multicarrier operation may normally receive a multicast broadcast service while receiving a paging-related message.

MODE FOR INVENTION

Figure 1:
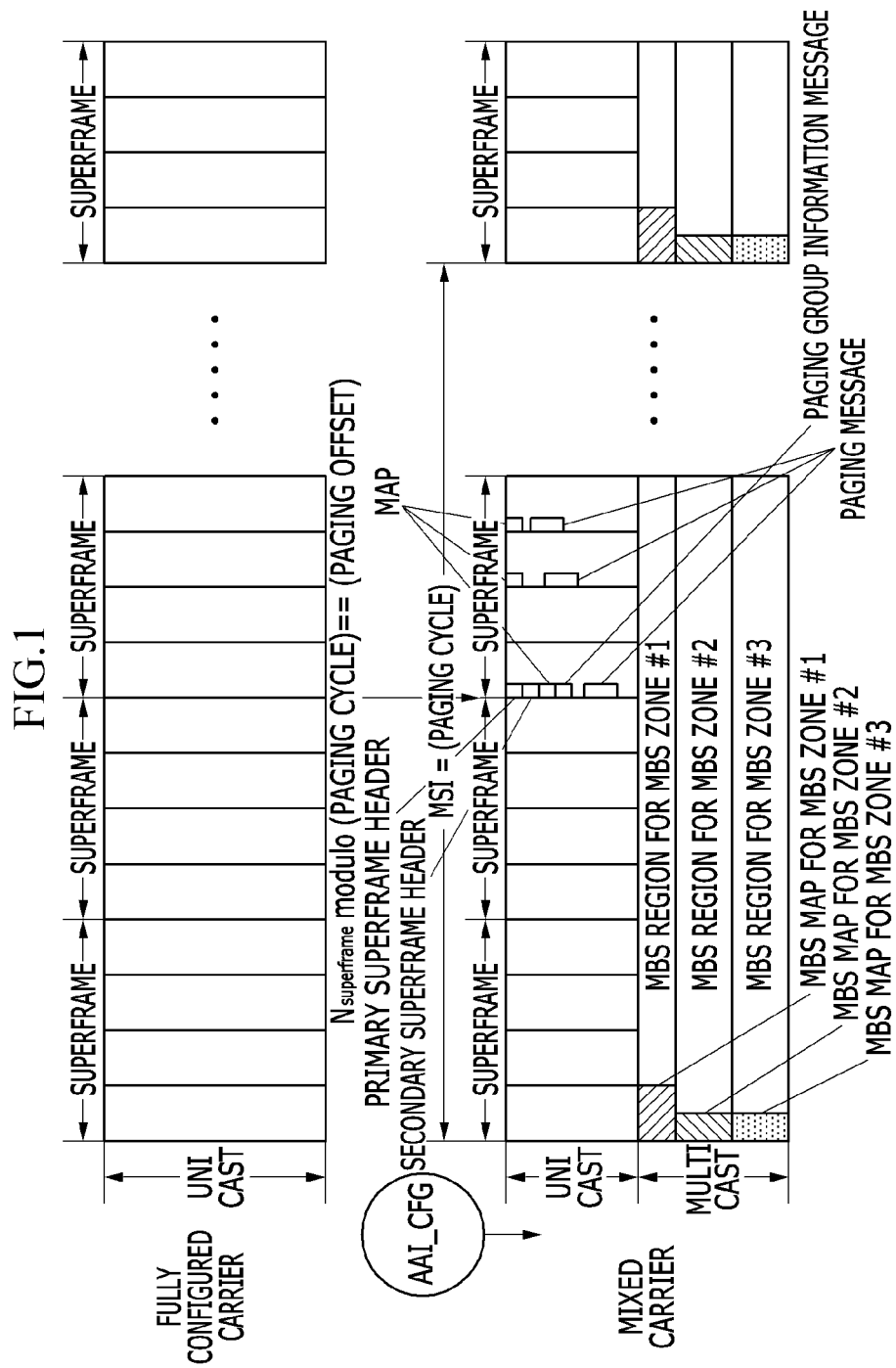
FIG. 1 shows a structure of a frame in a case in which a multicast broadcast service (MBS) is transmitted through a mixed carrier, and a paging group information message and a paging message are both transmitted through a mixed carrier according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

In this specification, a mobile station (MS) may refer to a terminal, a mobile terminal (MT), a subscriber station (SS), a portable subscriber station (PSS), user equipment (UE), or an access terminal (AT). The mobile terminal may include all or part of the functions of the mobile station, the subscriber station, the portable subscriber station, and the user equipment. In this specification, a base station (BS) may refer to an access point (AP), a radio access station (RAS), a node B, a base transceiver station (BTS), or an MMR (mobile multihop relay)-BS. The base station may include all or part of the functions of the access point, the radio access station, the node B, the base transceiver station, and the MMR-BS.

Also, in this specification, a carrier used for only multicast will be referred to as "a dedicated carrier", and a carrier used for both multicast and unicast will be referred to as "a mixed carrier".

Next, referring to FIGS. 1 to 4, the case in which a multicast broadcast service (MBS) is transmitted through a mixed carrier will be described.

FIG. 1 to FIG. 4 show a structure of a frame in a case in which an MBS is transmitted through a mixed carrier according to various embodiments of the present invention.

As shown in FIG. 1 to FIG. 4, a paging cycle is set to be equal to an MBS scheduling interval (MSI).

A base station supports a fully configured carrier and a mixed carrier. The fully configured carrier is divided by a superframe as a unit in the time domain. The mixed carrier is also divided by a superframe as a unit in the time domain. The mixed carrier may be divided into a unicast interval and a multicast interval on a frequency axis.

The multicast interval of the mixed carrier may be divided into a plurality of MBS zones on the frequency axis. In each MBS zone, an MBS map is located at the beginning of an MBS scheduling interval consisting of a plurality of superframes.

In FIG. 1 to FIG. 4, a paging offset is set as "3". In this case, a number $N_{superframe}$ of a superframe in which the paging relates messages such as a paging group information message (PGID Info message) and a paging message (paging advertisement message, PAG-ADV message) are transmitted is determined based on Equation 1.

$$N_{superframe} \text{ modulo(paging cycle)} = \text{paging offset} \quad \text{(Equation 1)}$$

Thus, referring to FIG. 1 to FIG. 4, a base station transmits a paging group information message and a paging message at the third superframe of a paging cycle.

FIG. 1 shows a structure of a frame in a case in which a multicast broadcast service (MBS) is transmitted through a mixed carrier, and a paging group information message and a paging message are both transmitted through a mixed carrier according to an embodiment of the present invention.

As shown in FIG. 1, through the mixed carrier, a primary superframe header (P-SFH), a secondary superframe header (S-SFH), a paging group information message, and a paging message are transmitted in the first subframe of the first frame included in the third superframe of the paging cycle. Within a single superframe, a plurality of paging messages may be transmitted. The plurality of paging messages may be transmitted in a plurality of frames. A paging-related message may be transmitted not in the first subframe, but in another subframe.

The location of the paging group information message is indicated by a map located at each frame. The paging group information message may include a time domain hash parameter (m) for each of a plurality of paging group identifiers, information on the number of paging carriers for each of a plurality of paging group identifiers, and information on each of a plurality of paging group identifiers. The information on each of a plurality of paging group identifiers may correspond to a paging carrier indication bit map.

A base station allocates a deregistration identifier (DID) to a mobile station in an idle mode. The DID is a unique value in a set of a paging group identifier, a paging cycle, and a paging offset. A mobile station may determine a number ($N_{pagingframe}$) of a frame for paging message in the superframe in which a paging message is transmitted, based on Equation 2.

$$N_{pagingframe} = DID \% m \quad \text{(Equation 2)}$$

The mobile station determines a number of a superframe and a number of a frame of the superframe in which a paging message is transmitted through Equation 1 and Equation 2, receives the paging message in the corresponding frame of the superframe, and performs location update based on the received contents.

Meanwhile, in a mobile wireless access system supporting multicarrier operation, a paging group information message is transmitted through all of the fully configured carriers and a paging message for a mobile station in an idle mode is transmitted through a single carrier. A mobile station in an idle mode may calculate a paging carrier index based on the following Equation 3.

$$\text{Paging carrier index} = DID \% N \quad \text{(Equation 3)}$$

In Equation 3, the N represents the number of paging carries included in a paging group allocated to a mobile station in an idle mode.

The mobile station in the idle mode may receive a paging message by switching to a paging carrier calculated by Equation 3 in a paging listening interval. If the mobile station does not obtain the paging carrier with Equation 3, the mobile station may again obtain information on paging carriers by performing location update.

Figure 2:
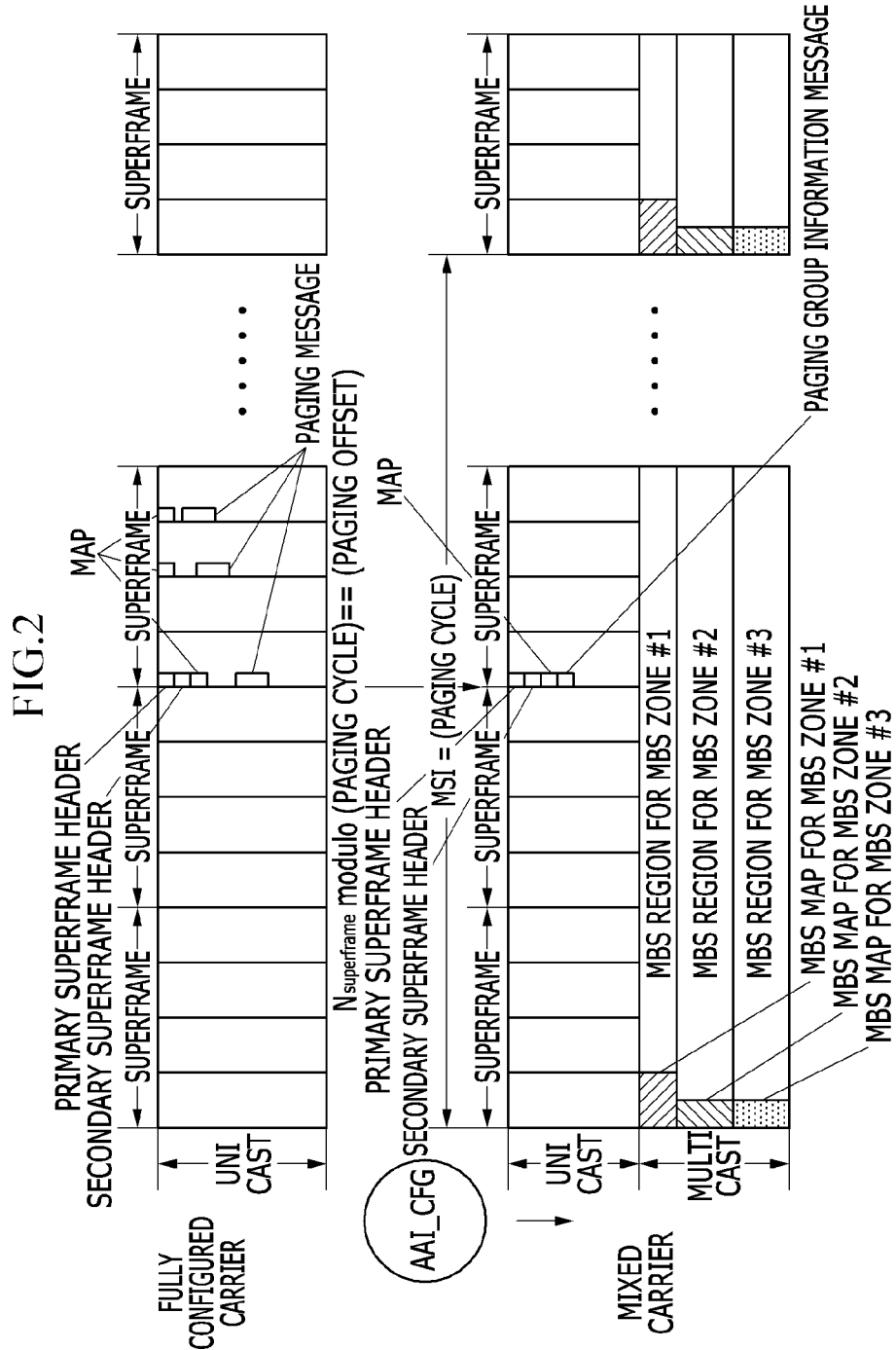
FIG. 2 shows a structure of a frame in a case in which an MBS is transmitted through a mixed carrier, a paging group information message is transmitted through a mixed carrier, and a paging message is transmitted through a fully configured carrier according to an embodiment of the present invention.

FIG. 2 shows a structure of a frame in a case in which an MBS is transmitted through a mixed carrier, a paging group information message is transmitted through a mixed carrier, and a paging message is transmitted through a fully configured carrier according to an embodiment of the present invention.

As shown in FIG. 2, a primary superframe header, a secondary superframe header, a map, and a paging group information message are transmitted through the mixed carrier in the first subframe of the first frame included in the third superframe of the paging cycle. Also, a primary superframe header, a secondary superframe header, a map, and a paging message are transmitted through the fully configured carrier different from the mixed carrier in the first subframe of the first frame included in the third superframe of the paging cycle. Within a single superframe, a plurality of paging messages may be transmitted. The plurality of paging messages may be transmitted in a plurality of frames. A paging-related message may be transmitted not in the first subframe, but in another subframe.

Figure 3:
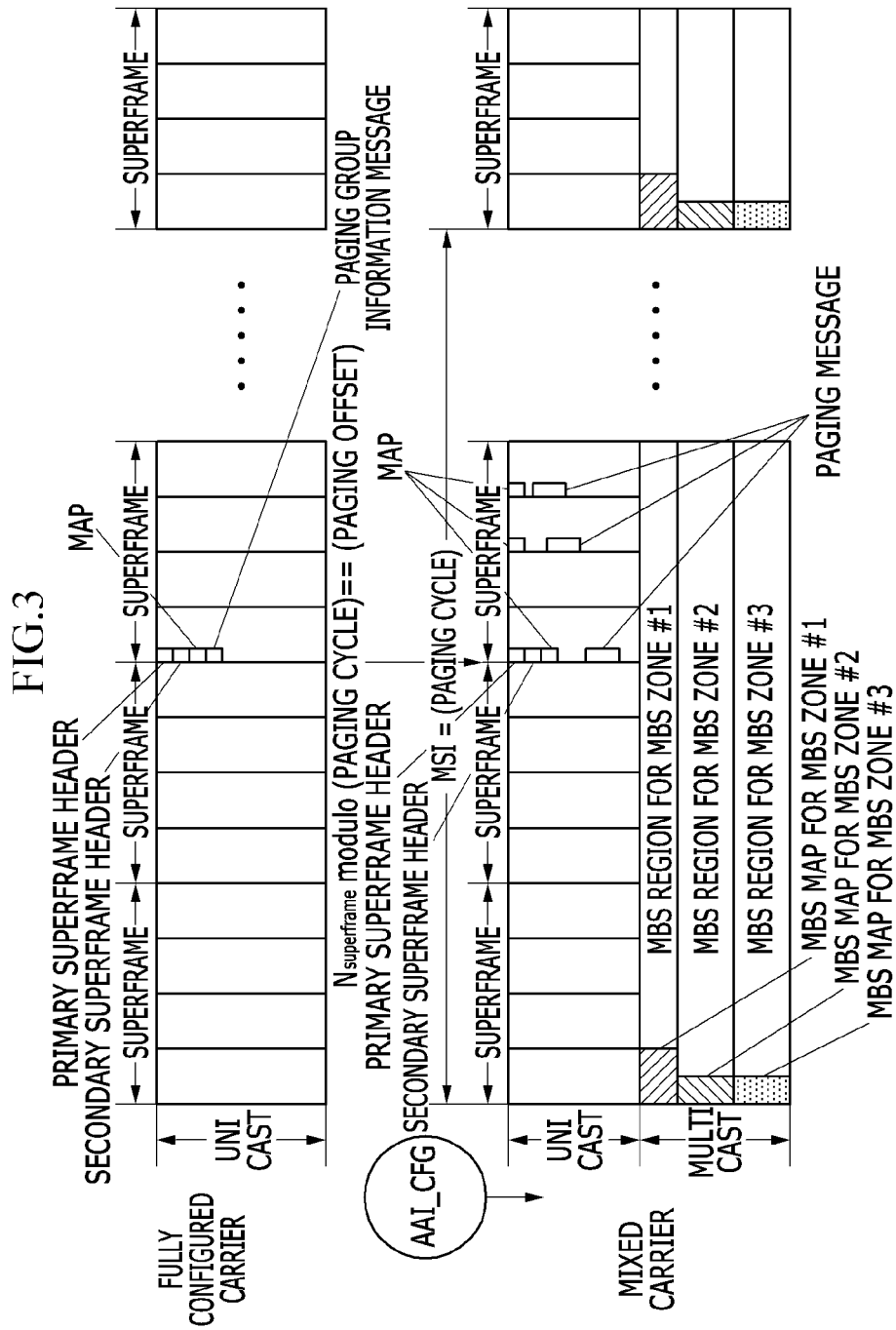
FIG. 3 shows a structure of a frame in a case in which an MBS is transmitted through a mixed carrier, a paging group information message is transmitted through a fully configured carrier, and a paging message is transmitted through a mixed carrier according to an embodiment of the present invention.

FIG. 3 shows a structure of a frame in a case in which an MBS is transmitted through a mixed carrier, a paging group information message is transmitted through a fully configured carrier, and a paging message is transmitted through a mixed carrier according to an embodiment of the present invention.

As shown in FIG. 3, a primary superframe header, a secondary superframe header, a map, and a paging message are transmitted through the mixed carrier in the first subframe of the first frame included in the third superframe of the paging cycle. Also, a primary superframe header, a secondary superframe header, a map, and a paging group information message are transmitted through the fully configured carrier different from the mixed carrier in the first subframe of the first frame included in the third superframe of the paging cycle. Within single superframe, a plurality of paging messages may be transmitted. The plurality of paging message may be transmitted in a plurality of frames. A paging-related message may be transmitted not in the first subframe, but in another subframe.

Figure 4:
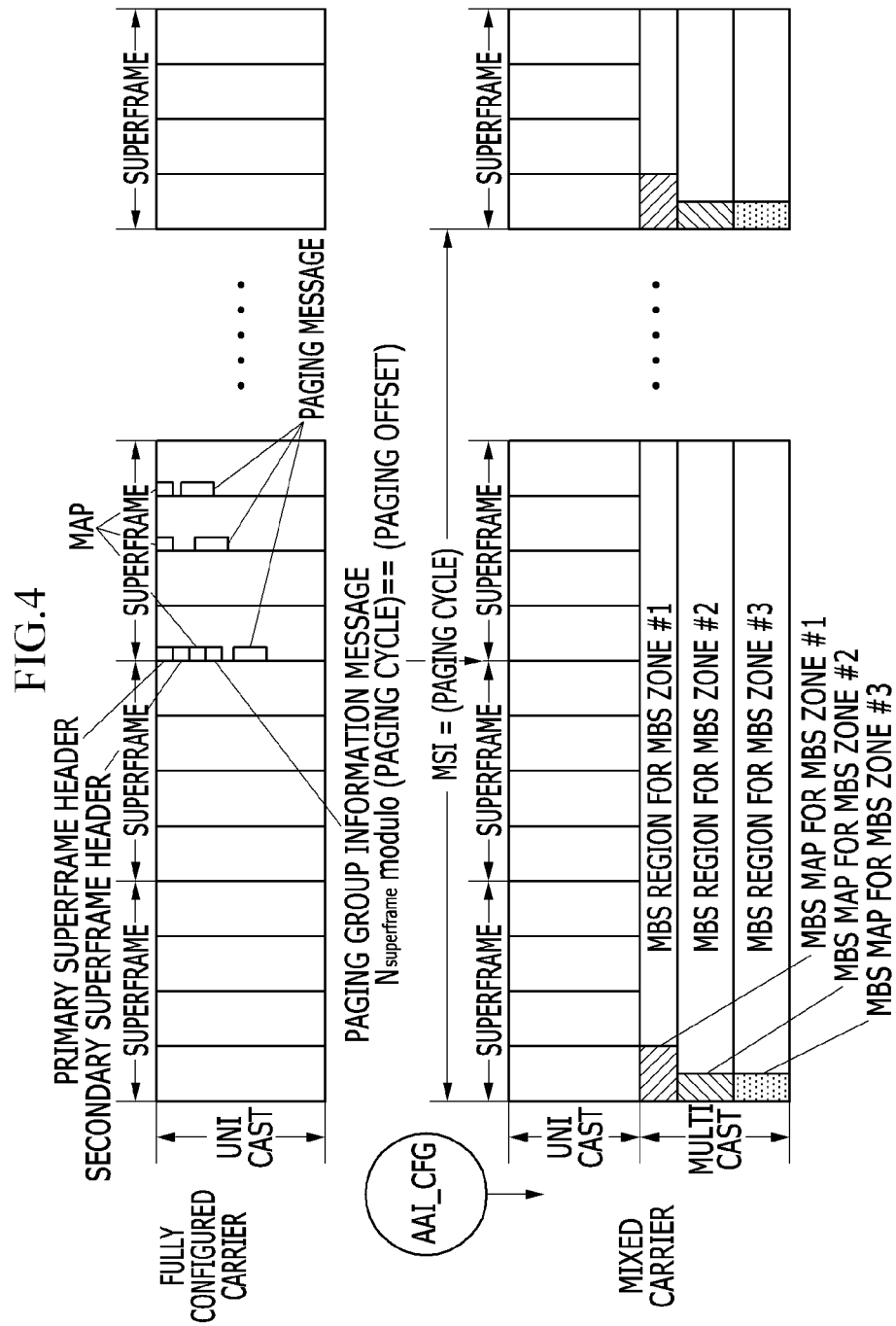
FIG. 4 shows a structure of a frame in a case in which an MBS is transmitted through a mixed carrier, and a paging group information message and a paging message are both transmitted through a fully configured carrier according to an embodiment of the present invention.

FIG. 4 shows a structure of a frame in a case in which an MBS is transmitted through a mixed carrier, and a paging group information message and a paging message are both transmitted through a fully configured carrier according to an embodiment of the present invention.

As shown in FIG. 4, a primary superframe header, a secondary superframe header, a map, a paging group information message, and a paging message are transmitted through the fully configured carrier different from the mixed carrier for the mixed carrier in the first subframe of the first frame included in the third superframe of the paging cycle. Within single superframe, a plurality of paging messages may be transmitted. The plurality of paging message may be transmitted in a plurality of frames. A paging-related message may be transmitted not in the first subframe, but in another subframe.

Next, a method for a mobile station to normally receive an MBS while receiving a paging-related message when the MBS is transmitted through a mixed carrier will be described.

It is assumed that an MBS is received through a mixed carrier. If a prior idle mode operation is applied, a mobile station switches a carrier to the carrier through which a paging-related message is transmitted, at the transmitting time point equal to those of a paging listening interval, a paging-related message transmission frame, and a paging-related message transmission subframe, in order to receive the paging-related message when all or part of the paging-related message is not transmitted through the mixed carrier. In this case, interruption with MBS-related traffic such as an MBS map, an MBS burst, and an MBS control message may occur at the time point for paging-related message transmission.

To solve this, a rule in which a paging-related message and MBS-related traffic are not transmitted at the same time point may be provided. For example, a base station may transmit a paging-related message at a time point at which any MBS-related traffic is not transmitted. Also, the base station may transmit a paging-related message at a time point excluding the time point at which MBS data concerned or received by the mobile station is transmitted. Further, the base station may set a time point at which MBS-related traffic is not transmitted as a paging listening interval. Further, the base station may set a specific time point and a specific resource region as a time point at which a paging-related message is transmitted. In order for MBS-related traffic to not be received at the same time point as the time point at which a paging-related message is transmitted, a mobile station informs a base station of information on a stream being received or an interested stream through combination of at least one among a MAC header and a MAC control message. Also, a structure of a frame may be designed so that a paging listening interval and an interval for receiving an MBS burst are not overlapped. The unit of the time point corresponds to a subframe, a frame, or a superframe. The time point for transmitting MBS burst may be set as a time point excluding the time point at which a paging-related message is transmitted.

When receiving an MBS through a mixed carrier, a base station may transmit a paging group information message through a mixed carrier, and may also transmit a paging message through a mixed carrier. The base station may transmit a paging-related message through a unicast region of a mixed carrier or transmit it regardless of a unicast region and a multicast region.

When a paging-related message is transmitted through a mixed carrier, it may be allowed for a paging carrier index calculated by Equation 3 to become a carrier index of a mixed carrier for an MBS, or it may be allowed for a paging carrier index without calculation by Equation 3 to become a carrier index of a mixed carrier for an MBS. Also, although the current mixed carrier is not a fully configured carrier, it may be allowed for a paging-related message to be transmitted through the current mixed carrier. In this case, a mobile station has no need to switch to another fully configured carrier in order to receive a paging-related message in a paging listening interval. At this time, similar to the case in which all or part of a paging-related message is not transmitted through a mixed carrier, it may make the time point at which the paging-related message is transmitted be not the same as the time point at which MBS-related traffic is transmitted, and thereby the paging-related message is transmitted. Also, the base station may transmit a paging-related message at a specific time point. Here, the specific time point corresponds to the last time point of an MBS scheduling interval (MSI), the start time point of the MSI, a time point just before the start of the MSI, and a time point in the middle of the MSI, and the base station may not transmit MBS-related traffic at the corresponding time point. The unit of the corresponding time point may correspond to a subframe, a frame, or a superframe. The transmission time point for MBS burst may be set excluding the time point at which a paging-related message is transmitted.

Next, referring to FIG. 5 to FIG. 8, the case in which an MBS is transmitted through a dedicated carrier will be described.

FIG. 5 to FIG. 8 show a structure of a frame in a case in which an MBS is transmitted through a dedicated carrier according to various embodiments of the present invention.

As shown in FIG. 5 to FIG. 8, a paging cycle is set to be equal to an MBS scheduling interval.

A base station supports a fully configured carrier and a dedicated carrier. The fully configured carrier is divided by a superframe as a unit in the time domain. The dedicated carrier is also divided by a superframe as a unit in the time domain.

The multicast interval mixed carrier may be divided into a unicast interval and a multicast interval on a frequency axis. The multicast interval of the dedicated carrier may be divided into a plurality of MBS zones on a frequency axis. In each MBS zone, an MBS map is located at the beginning of an MBS scheduling interval that includes a plurality of superframes.

In FIG. 5 to FIG. 8, a paging offset is set as "3".

Thus, based on Equation 1, a base station transmits a paging group information message and a paging message at the third superframe of a paging cycle.

Figure 5:
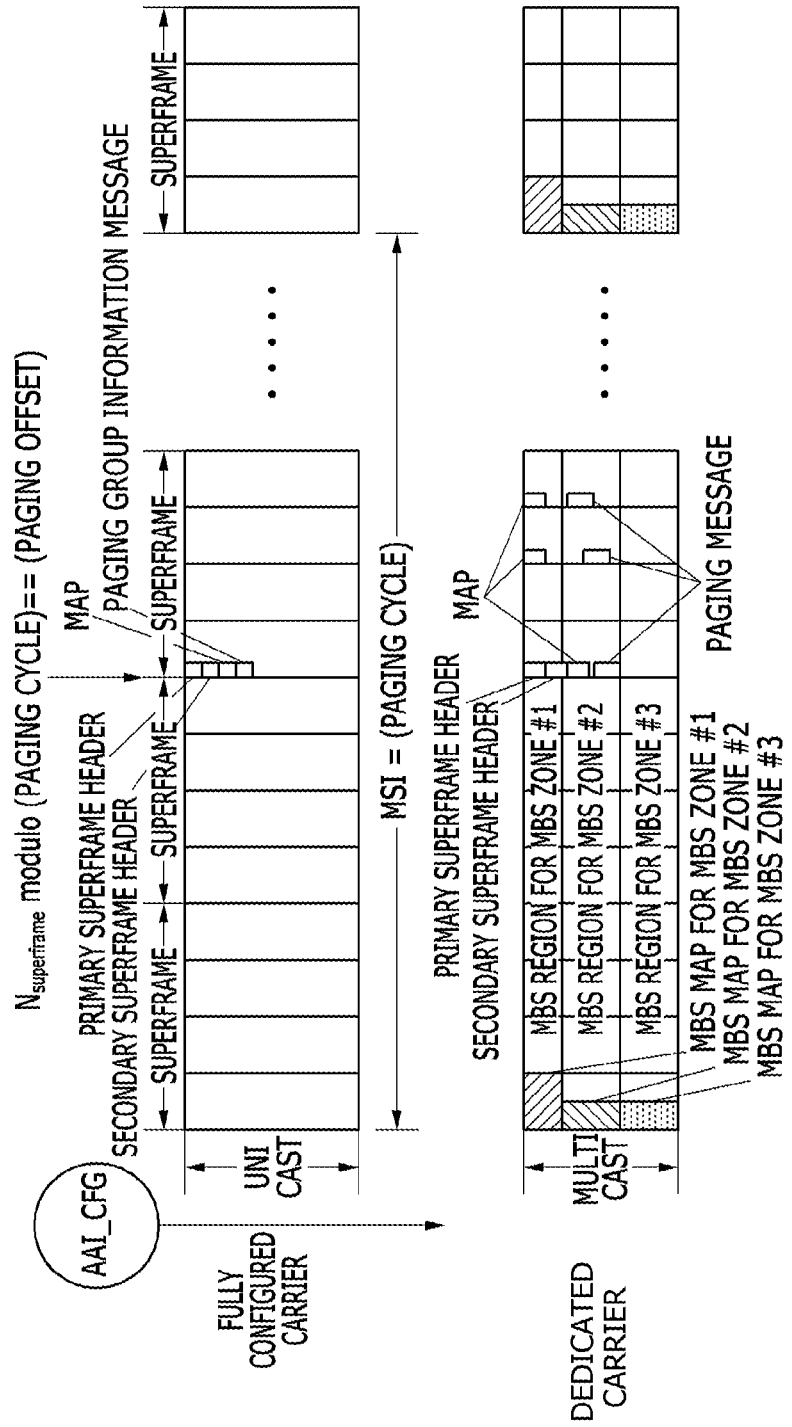
FIG. 5 shows a structure of a frame in a case in which an MBS is transmitted through a dedicated carrier, a paging group information message is transmitted through a fully configured carrier, and a paging message is transmitted through a dedicated carrier according to an embodiment of the present invention.

FIG. 5 shows a structure of a frame in a case in which an MBS is transmitted through a dedicated carrier, a paging group information message is transmitted through a fully configured carrier, and a paging message is transmitted through a dedicated carrier according to an embodiment of the present invention.

As shown in FIG. 5, through the dedicated carrier, a primary superframe header, a secondary superframe header, a map, and a paging message are transmitted in the first subframe of the first frame included in the third superframe of the paging cycle. Also, through the fully configured carrier different from the dedicated carrier, a primary superframe header, a secondary superframe header, a map, and a paging group information message are transmitted in the first subframe of the first frame included in the third superframe of the paging cycle. Within the single superframe, a plurality of paging messages may be transmitted. The plurality of paging messages may be transmitted in a plurality of frames. A paging-related message may be transmitted not in the first subframe, but in another subframe.

Figure 6:
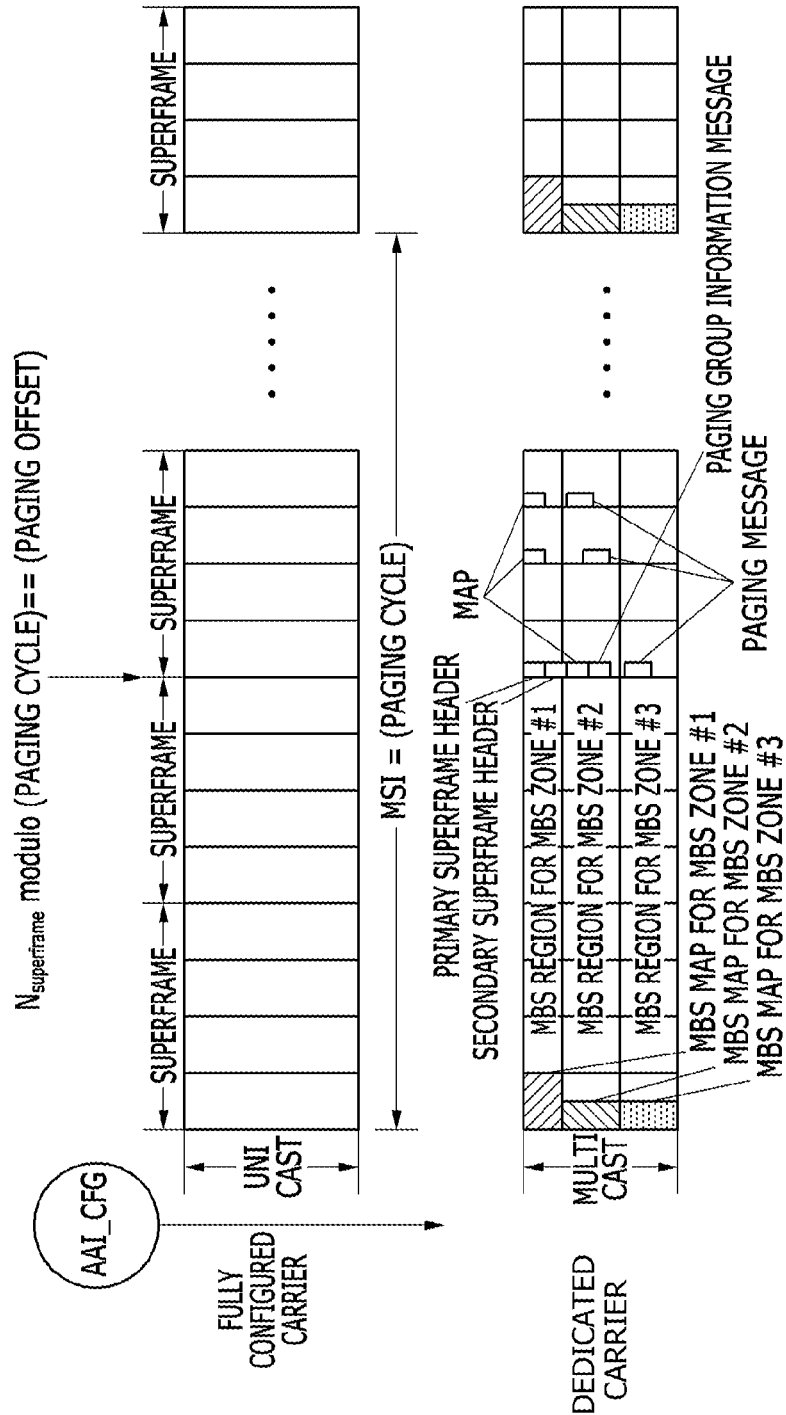
FIG. 6 shows a structure of a frame in a case in which an MBS is transmitted through a dedicated carrier, and a paging group information message and a paging message are both transmitted through a dedicated carrier according to an embodiment of the present invention.

FIG. 6 shows a structure of a frame in a case in which an MBS is transmitted through a dedicated carrier, and a paging group information message and a paging message are both transmitted through a dedicated carrier according to an embodiment of the present invention.

As shown in FIG. 6, a primary superframe header (P-SFH), a secondary superframe header (S-SFH), a map, a paging group information message, and a paging message are transmitted through the dedicated carrier in the first subframe of the first frame included in the third superframe of the paging cycle. Within the single superframe, a plurality of paging messages may be transmitted. The plurality of paging messages may be transmitted in a plurality of frames. A paging-related message may be transmitted not in the first subframe, but in another subframe.

Figure 7:
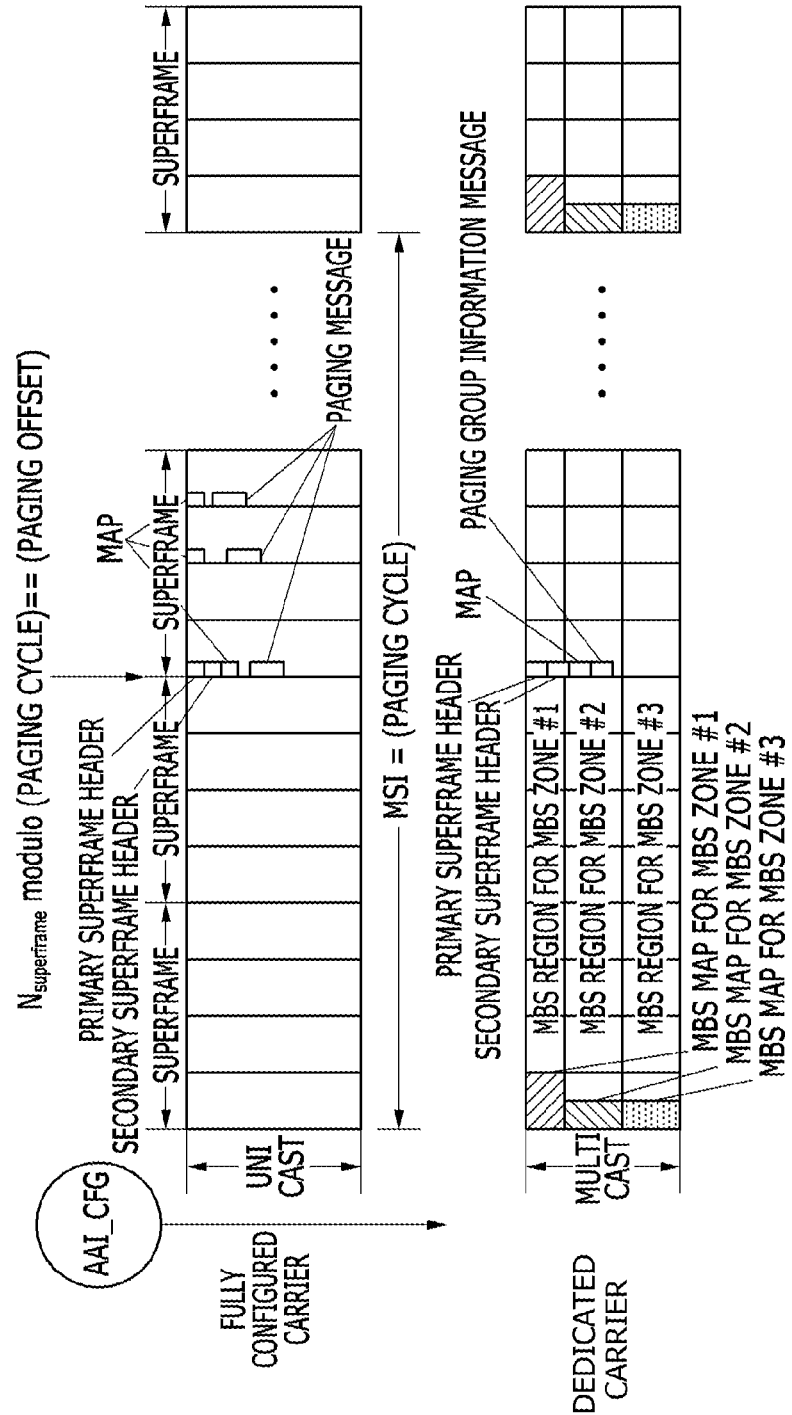
FIG. 7 shows a structure of a frame in a case in which an MBS is transmitted through a dedicated carrier, a paging group information message is transmitted through a dedicated carrier, and a paging message is transmitted through a fully configured carrier according to an embodiment of the present invention.

FIG. 7 shows a structure of a frame in a case in which an MBS is transmitted through a dedicated carrier, a paging group information message is transmitted through a dedicated carrier, and a paging message is transmitted through a fully configured carrier according to an embodiment of the present invention.

As shown in FIG. 7, a primary superframe header, a secondary superframe header, a map, and a paging group information message are transmitted through the dedicated carrier in the first subframe of the first frame included in the third superframe of the paging cycle. Also, a primary superframe header, a secondary superframe header, a map, and a paging message are transmitted through the fully configured carrier different from the dedicated carrier in the first subframe of the first frame included in the third superframe of the paging cycle. Within the single superframe, a plurality of paging messages may be transmitted. The plurality of paging messages may be transmitted in a plurality of frames. A paging-related message may be transmitted not in the first subframe, but in another subframe.

Figure 8:
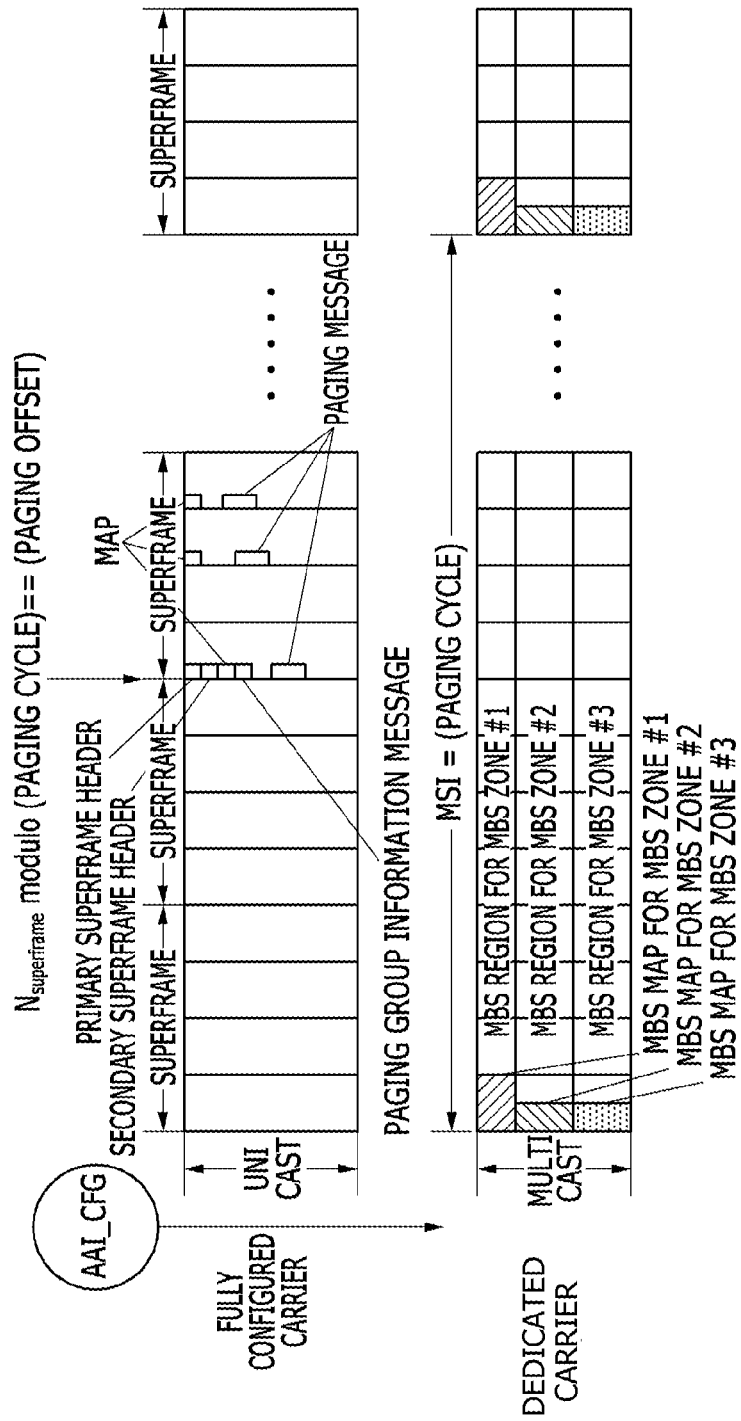
FIG. 8 shows a structure of a frame in a case in which an MBS is transmitted through a dedicated carrier, and a paging group information message and a paging message are both transmitted through different fully configured carriers according to an embodiment of the present invention.

FIG. 8 shows a structure of a frame in a case in which an MBS is transmitted through a dedicated carrier, and a paging group information message and a paging message are both transmitted through different fully configured carriers according to an embodiment of the present invention.

As shown in FIG. 8, a primary superframe header, a secondary superframe header, a map, a paging group information message, and a paging message are transmitted through the fully configured carrier different from the dedicated carrier in the first subframe of the first frame included in the third superframe of the paging cycle. Within the single superframe, a plurality of paging messages may be transmitted through another fully configured carrier. The plurality of paging messages may be transmitted in a plurality of frames. A paging-related message may be transmitted not in the first subframe, but in another subframe.

Next, a method for a mobile station to normally receive an MBS while receiving a paging-related message when the MBS is transmitted through a dedicated carrier will be described.

Similar to the case in which an MBS is transmitted through a mixed carrier, when an MBS is transmitted through a dedicated carrier, if a prior idle mode operation is applied, a mobile station switches its carrier to the carrier through which a paging-related message is transmitted, at the transmitting time point equal to those of a paging listening interval, a paging-related message transmission frame, and a paging-related message transmission subframe, in order to receive the paging-related message when all or part of the paging-related message is not transmitted through the mixed carrier. The mobile station may select a paging carrier based on Equation 3. Similar to the case in which an MBS is transmitted through a mixed carrier, an interruption with MBS-related traffic may occur.

To solve this, it is possible to define that the MBS-related traffic is not to be transmitted along with a paging-related message at the same time point. For example, at the time point at which no MBS-related traffic is transmitted, the base station may transmit a paging-related message. Also, the base station may transmit a paging-related message at a time point excluding the time point in which interested MBS data or MBS data received by the mobile station is transmitted. Further, the base station may set a time point at which MBS-related traffic is not transmitted as a paging listening interval. Further, the base station may set a specific time point and a specific resource region as a time point at which a paging-related message is transmitted. In order for MBS-related traffic to not be received at the same time point as the time point at which a paging-related message is transmitted, a mobile station informs a base station of information on a stream being received or an interested stream through a combination of at least one among a MAC header and a MAC control message. In case of need, the mobile station may inform the base station of information on a stream being received or an interested stream after performing carrier switching. The unit of the time point corresponds to a subframe, a frame, or a superframe.

When receiving an MBS through a dedicated carrier, a base station may transmit all or a part of a paging-related message through a dedicated carrier. That is, the base station may transmit the message to be transmitted in a unicast region through a multicast region. In this case, the base station may predefine a specific region (including a time point) of a dedicated carrier as a region in which a paging-related message is transmitted or inform the mobile station of information on a region in which a paging-related message is transmitted. The base station may inform the mobile station of information on a region in which a paging-related message is transmitted through a combination of at least one among a MAC header, a MAC control message, a control channel, and a predetermined method. The base station may disregard Equation 3 and transmit a paging-related message through a dedicated carrier through which the current MBS is transmitted. Also, though the current dedicated carrier is not a fully configured carrier, it is allowed for a paging-related message to be transmitted through the corresponding dedicated carrier. In this case, the mobile station does not need to switch its carrier to another fully configured carrier in order to receive a paging-related message during a paging listening interval. By managing an idle node with only Equations 1 and 2, the number of cases of performing carrier switching for receiving a paging-related message may be reduced as much as possible. Also, changing of a prior method for managing an idle mode may be minimized, and thereby a method for managing an idle mode may be possible in a multicarrier environment. Also, similar to the case in which all or part of a paging-related message is not transmitted through a mixed carrier, it may make the time point at which the paging-related message is transmitted not be the same as the time point at which MBS-related traffic is transmitted. Also, the base station may transmit a paging-related message at a specific time point. Here, the specific time point corresponds to the last time point of an MSI, the start time point of the MSI, a time point just before the start of the MSI, and a time point in the middle of the MSI, and the base station may not transmit MBS-related traffic at the corresponding time point. The unit of the corresponding time point may correspond to a subframe, a frame, or a superframe. The transmission time point for the MBS burst may be calculated excluding the time point at which a paging-related message is transmitted.

To more simply and efficiently support an MBS and an idle mode, a system may be designed to make an MBS zone coincide with a PGID. Also, among the above-described cases, one or more may be chosen. The embodiments of the present invention may be applied to the case in which an MBS is transmitted through both a mixed carrier and a dedicated carrier. In this case, a mobile station may inform a base station of information on a stream being received or an interested stream along with information on a carrier for receiving an MBS.

Next, referring to FIG. 9, a structure of a frame in which an MBS is transmitted according to another embodiment of the present invention will be described.

Figure 9:
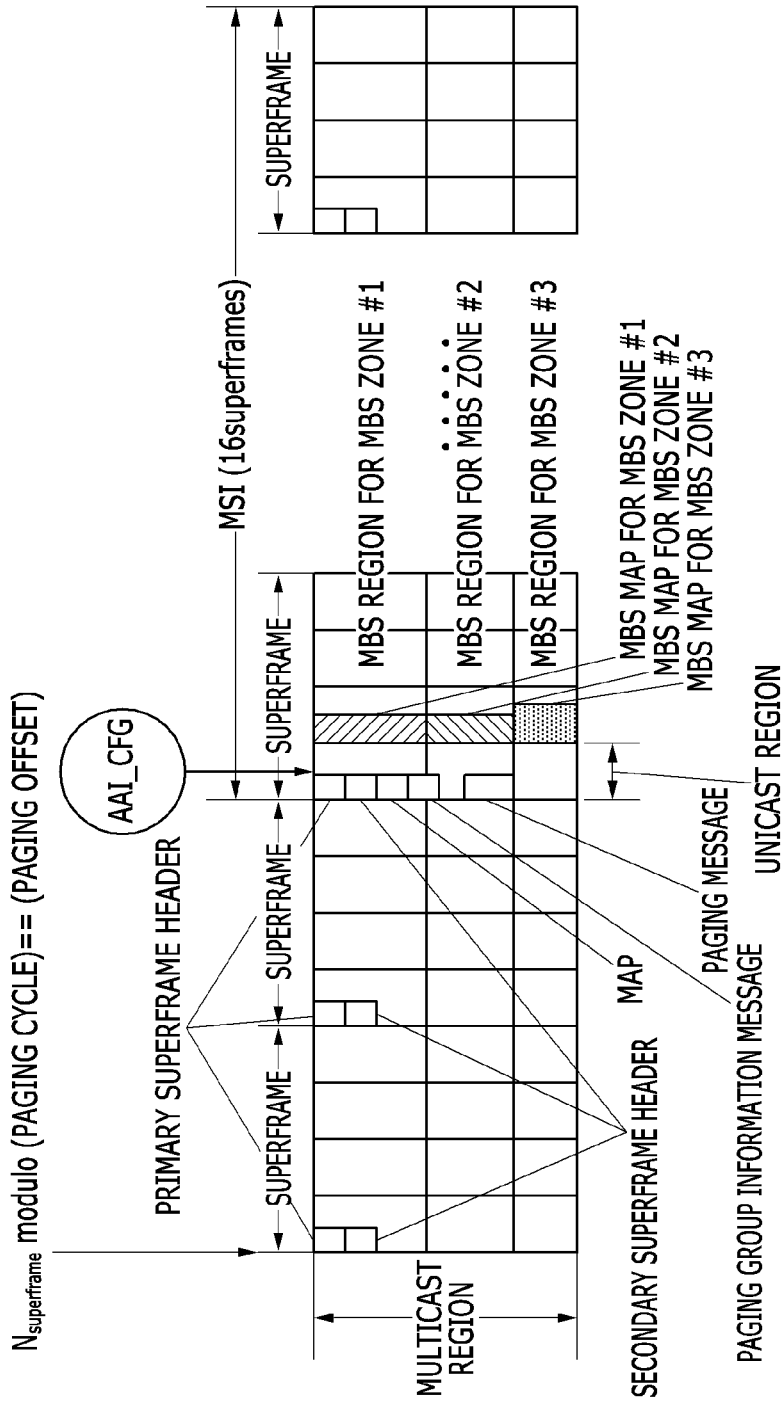
FIG. 9 shows a structure of a frame in a case in which an MBS is transmitted according to another embodiment of the present invention.

FIG. 9 shows a structure of a frame in a case in which an MBS is transmitted according to another embodiment of the present invention.

As shown in FIG. 9, a carrier through which an MBS is transmitted is divided into a unicast region and a multicast region based on time division multiplexing (TDM). In the unicast region, a system configuration descriptor message (an SCD message), a paging group information message, a paging message, an MBS configuration message (an MBS CFG message), and others. Here, the unicast region may correspond to the last time point of an MSI, the start time point of the MSI, a time point just before the start of the MSI, and a time point in the middle of the MSI. The unicast region may be fixed, and a base station may inform the location of the unicast region. When the location of the unicast region is changed, the location of the previously informed unicast may be maintained until the new location of the unicast region is informed. The unit of the corresponding time point may correspond to a subframe, a frame, or a superframe. During the time excluding the unicast region, the multicast region may exist, and a base station transmits an MBS through the corresponding multicast region.

Particularly, FIG. 9 shows the case in which the unicast region is fixed in the first frame of the first subframe of an MSI, but the unicast region may be located at another location. As shown in FIG. 9, for an idle mode, the region in which a paging-related message is transmitted may be the same as or different from the region in which the MBS configuration message is transmitted.

Also, the unit of the corresponding time point may correspond to a subframe, a frame, or a superframe.

A mobile station receives an MBS or a message for supporting an idle mode and others in the unicast region in the middle of receiving an MBS. If a paging listening interval determined by a paging cycle, a paging offset, and others corresponds to a region excluding the unicast region and there is no MBS received by a mobile station in the unicast region, the mobile station may receive a paging-related message by switching its carrier to a primary carrier or another fully configured carrier and the base station may transmit the paging-related message in the unicast region. In this case, the mobile station waits for the first unicast region after the paging listening interval and then receives a paging-related message so that it continuously performs an idle mode or switches its carrier to another carrier at the corresponding time point to receive a paging-related message. Also, the paging listening interval may be synchronized with the unicast region. When an MBS service is based on the above, a base station regards the multicast region excluding the unicast region as a logically connected resource unit and selects a resource unit for an MBS map and an MBS burst based on the logically connected resource unit. The method for forming the frame having the above-described structure may be applied to both a mixed carrier and a dedicated carrier.

Next, referring to FIG. 10 to FIG. 12, a base station and a mobile station according to an embodiment of the present invention will be described.

Figure 10:
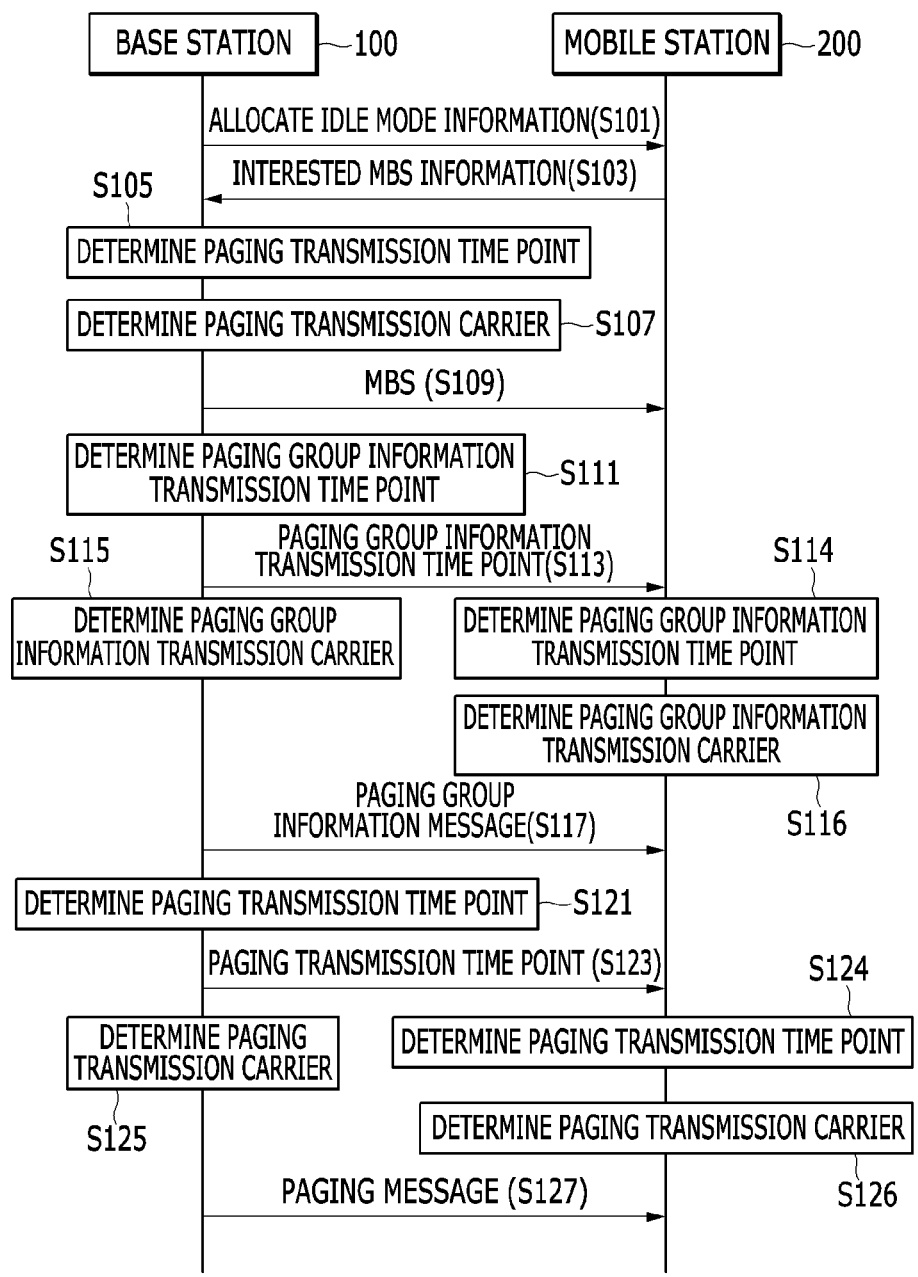
FIG. 10 shows a method for transmitting a paging message and a method for receiving a paging message according to an embodiment of the present invention.

FIG. 10 shows a method for transmitting a paging message and a method for receiving a paging message according to an embodiment of the present invention.

First, based on FIG. 10, a method for transmitting a paging message by a base station 100 will be described.

The base station 100 allocates a deregistration identifier (DID), a paging cycle, a paging offset, and a paging group identifier to a mobile station 200 that is entering into an idle mode (S101). The base station 100 may allocate the deregistration identifier (DID), the paging cycle, the paging offset, and the paging group identifier by using a single message or a plurality of messages.

The base station 100 receives part or all of information on an interested MBS that is being received or is scheduled to be received by the mobile station 200, and information on a transmission carrier for an interested MBS that is being received or is scheduled to be received by the mobile station 200 (S103).

The base station 100 determines a transmission time point for each of a plurality of MBSs (S105), and determines a transmission carrier for each of a plurality of MBSs (S107).

After this, the base station 100 transmits each of the plurality of MBSs at the determined transmission time point through the determined transmission carrier (S109).

The base station 100 determines a transmission time point for a paging group information message (S111). The base station 100 may determine the transmission time point for the paging group information message as shown in FIG. 1 to FIG. 9. The base station 100 may determine a predetermined and fixed time point or a time point as a transmission time point for the paging group information message. When the mobile station 200 does not receive an MBS, the base station 100 may determine the transmission time point for the paging group information message based on Equation 1 (S111).

When the mobile station 200 receives an MBS, the base station 100 may determine the transmission time point for the paging group information message to be different from the transmission time point for each of the plurality of MBSs. Also, when the mobile station 200 receives an MBS, the base station 100 may determine the transmission time point for the paging group information message to be different from the transmission time point for the MBS in which the mobile station 200 is interested among the plurality of MBSs.

When the mobile station 200 receives an MBS, the base station 100 may determine the transmission time point for the paging group information message based on Equation 1 (S111). Also, the base station 100 may determine a predetermined and fixed time point or a time point as the transmission time point for the paging group information message. At this time, the base station 100 may determine the transmission time point for each of the plurality of MBSs to be different from the transmission time point for the paging group information message (S105). Also, the base station 100 may determine the transmission time point for the interested MBS of the mobile station 200 to be different from the transmission time point for the paging group information message (S105).

The base station 100 informs the mobile station 200 of the determined transmission time point for the paging group information message (S113). Particularly, when the base station 100 determines the transmission time point for the paging group information message at specific time, the base station 100 may inform the mobile station 100 of the determined transmission time point.

The base station 100 determines a transmission carrier for the paging group information message (S115). The base station 100 may determine all of the fully configured carriers as the transmission carrier for the paging group information message. When the mobile station 200 receives an MBS, the base station 100 may determine the transmission carrier for the interested MBS of the mobile station 200 as the transmission carrier for the paging group information message.

After this, the base station 100 transmits the paging group information message through the determined carrier at the determined transmission time point (S117).

The base station 100 determines the transmission time point for the paging message (S121).

The base station 100 may determine the transmission time point for the paging message as shown in FIG. 1 to FIG. 9.

The base station 100 may determine a predetermined and fixed time point or a time point as a transmission time point for the paging message. When the mobile station 200 does not receive an MBS, the base station 100 may determine the transmission time point for the paging message based on Equations 1 and 2 (S121).

When the mobile station 200 receives an MBS, the base station 100 may determine the transmission time point for the paging message to be different from the transmission time point for each of the plurality of MBSs. Also, when the mobile station 200 receives an MBS, the base station 100 may determine the transmission time point for the paging message to be different from the transmission time point for the MBS in which the mobile station 200 is interested among the plurality of MBSs.

When the mobile station 200 receives an MBS, the base station 100 may determine the transmission time point for the paging message based on Equation 1 (S121). Also, when the mobile station 200 receives an MBS, the base station 100 may determine a predetermined and fixed time point or a time point as the transmission time point for the paging message. At this time, the base station 100 may determine the transmission time point for each of the plurality of MBSs to be different from the transmission time point for the paging message (S105). Also, the base station 100 may determine the transmission time point for the interested MBS of the mobile station 200 to be different from the transmission time point for the paging message (S105).

The base station 100 informs the mobile station 200 of the determined transmission time point for the paging message (S123). Particularly, when the base station 100 determines a time point as the transmission time point for the paging message, the base station 100 may inform the mobile station 200 of the determined transmission time point for the paging message.

The base station 100 determines a transmission carrier for the paging message (S125). The base station 100 may determine the transmission carrier for the paging message based on Equation 3. Particularly, when the mobile station 200 does not receive an MBS, the base station 100 may determine the transmission carrier for the paging message based on Equation 3. When the mobile station 200 receives an MBS, the base station 100 disregards Equation 3 and may determine an MBS receiving carrier of the mobile station 200 as the transmission carrier for the paging message. When the mobile station 200 receives an MBS, the base station 100 disregards Equation 3 and may determine a transmission carrier for the interested MBS of the mobile station 200 as the transmission carrier for the paging message.

After this, the base station 100 transmits the paging message through the determined transmission carrier at the determined transmission time point (S127).

Next, referring to FIG. 10, a method for the mobile station 200 to receive a paging message will be described.

The mobile station 200, in an idle mode, receives the deregistration identifier (DID), the paging cycle, the paging offset, and the paging group identifier from the base station 200 (S101).

The mobile station 200 informs the base station 100 of part or all of information on an interested MBS that is being received or is scheduled to be received, and information on a transmission carrier for an interested MBS that is being received or is scheduled to be received (S103).

The mobile station 200 receives a part or all of the plurality of MBSs transmitted from the base station 100 (S109).

The mobile station 200 receives information on the determined transmission time point for the paging group information message from the base station 100 (S113).

The mobile station 200 determines the transmission time point for the paging group information message (S114). The mobile station 200 may determine the transmission time point for the paging group information message as shown in FIG. 1 to FIG. 9. The mobile station 200 may determine a predetermined and fixed time point or a time point as the transmission time point for the paging group information message. The mobile station 200 may determine the transmission time point for the paging group information message based on information on a transmission time point provided from the base station 100.

The mobile station 200 determines a transmission carrier for the paging group information message (S116). The base station 100 may determine all of the fully configured carriers as the transmission carrier for the paging group information message. When the mobile station 200 receives an MBS, the base station 100 may determine the transmission carrier for the interested MBS of the mobile station 200 as the transmission carrier for the paging group information message.

After this, the mobile station 200 receives the paging group information message through the determined transmission carrier at the determined transmission time point (S117).

The mobile station 200 receives information on the transmission time point for the paging message from the base station 100 (S123).

The mobile station 200 determines the transmission time point for the paging message (S124).

The mobile station 200 may determine the transmission time point for the paging message as shown in FIG. 1 to FIG. 9. The mobile station 200 may determine a predetermined and fixed time point or a time point as the transmission time point for the paging message. The mobile station 200 may determine the transmission time point for the paging message based on information on a transmission time point provided from the base station 100.

The mobile station 200 determines a transmission carrier for the paging message (S126). The mobile station 200 may determine the transmission carrier for the paging message based on Equation 3. Particularly, when the mobile station 200 does not receive an MBS, the mobile station 200 may determine the transmission carrier for the paging message based on Equation 3. When the mobile station 200 receives an MBS, the mobile station 200 may disregard Equation 3 and determine an MBS receiving carrier as the transmission carrier for the paging message. When the mobile station 200 receives an MBS, the mobile station 200 may disregard Equation 3 and determine a transmission carrier for the interested MBS of the mobile station 200 as the transmission carrier for the paging message.

After this, the mobile station 200 receives a paging message through the determined transmission carrier at the determined transmission time point (S127).

Figure 11:
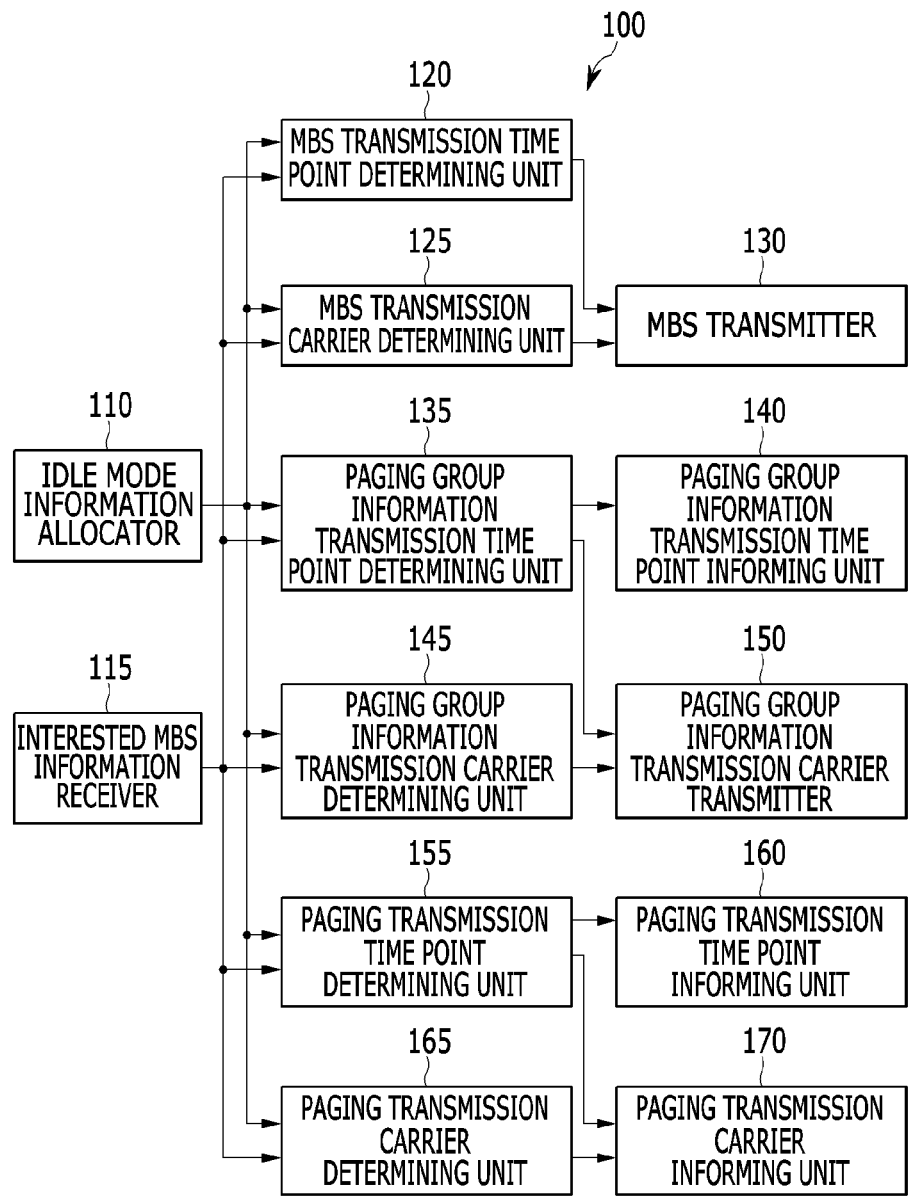
FIG. 11 shows a block diagram of a base station according to an embodiment of the present invention.

FIG. 11 shows a block diagram of a base station according to an embodiment of the present invention.

As shown in FIG. 11, a base station 100 according to an embodiment of the present invention includes an idle mode information allocator 110, an interested MBS information receiver 115, an MBS transmission time point determining unit 120, an MBS transmission carrier determining unit 125, an MBS transmitter 130, a paging group information transmission time point determining unit 135, a paging group information transmission time point informing unit 140, a paging group information transmission carrier determining unit 145, a paging group information transmission carrier transmitter 150, a paging transmission time point determining unit 155, a paging transmission time point informing unit 160, a paging transmission carrier determining unit 165, and a paging transmission carrier informing unit 170.

The idle mode information allocator 110 allocates idle mode information such as a deregistration identifier (DID), a paging cycle, a paging offset, and a paging group identifier to a mobile station 200 in an idle mode.

The interested MBS information receiver 115 receives part or all of information on an interested MBS that is being received or is scheduled to be received by the mobile station 200, and information on a transmission carrier for an interested MBS that is being received or is scheduled to be received by the mobile station 200.

The MBS transmission time point determining unit 120 determines a transmission time point for each of a plurality of MBSs.

The MBS transmission carrier determining unit 125 determines a transmission carrier for each of a plurality of MBSs.

The MBS transmitter 130 transmits each of the plurality of MBSs through the determined transmission carrier at the determined transmission time point.

The paging group information transmission time point determining unit 135 determines a transmission time point for a paging group information message.

The paging group information transmission time point informing unit 140 informs the mobile station 200 of the determined transmission time point for the paging group information message.

The paging group information transmission carrier determining unit 145 determines a transmission carrier for the paging group information message.

The paging group information transmitter 150 transmits the paging group information message through the determined transmission carrier at the determined transmission time point.

The paging transmission time point determining unit 155 determines a transmission time point for a paging message.

The paging transmission time point informing unit 160 informs the mobile station 200 of the determined transmission time point for the paging message.

The paging transmission carrier determining unit 165 determines a transmission carrier for the paging message.

The paging transmitter 170 transmits the paging message through the determined transmission carrier at the determined transmission time point.

Figure 12:
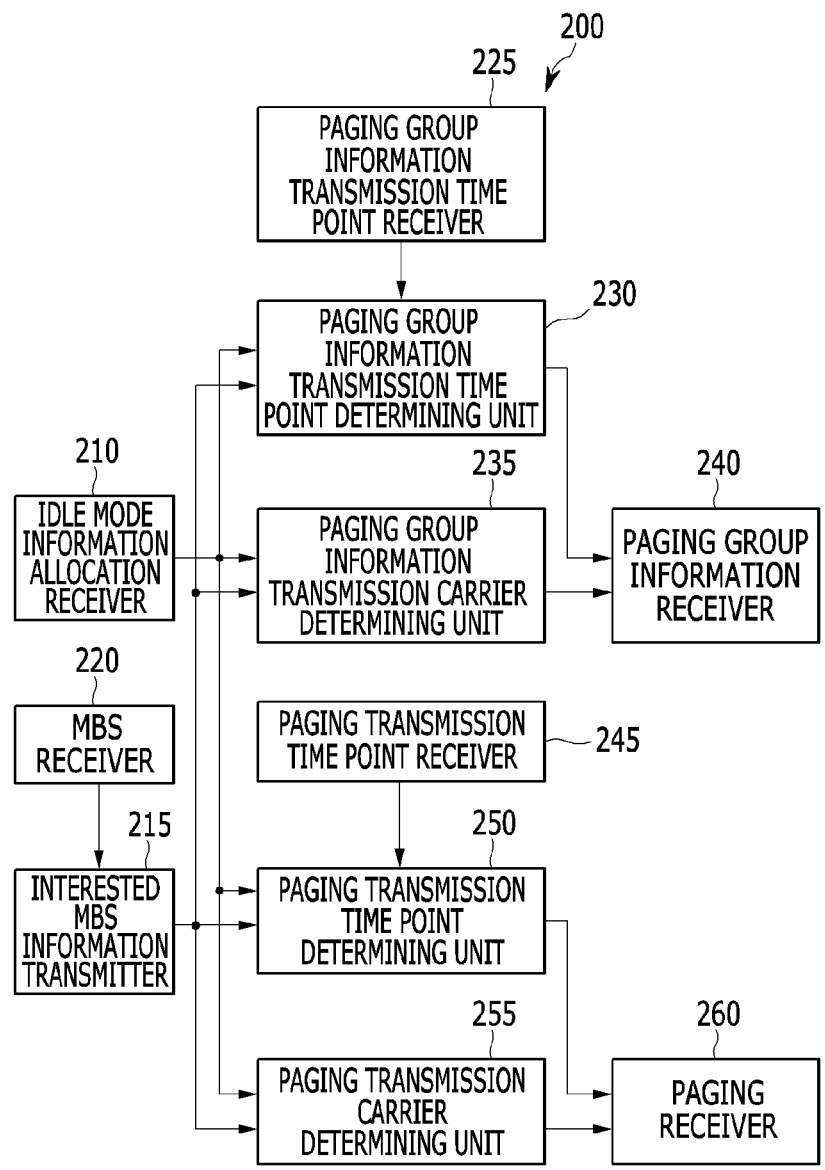
FIG. 12 shows a block diagram of a mobile station according to an embodiment of the present invention.

FIG. 12 shows a block diagram of a mobile station according to an embodiment of the present invention.

As shown in FIG. 12, a mobile station 200 according to an embodiment of the present invention includes an idle mode information allocation receiver 210, an interested MBS information transmitter 215, an MBS receiver 220, a paging group information transmission time point receiver 225, a paging group information transmission time point determining unit 230, a paging group information transmission carrier determining unit 235, a paging group information receiver 240, a paging transmission time point receiver 245, a paging transmission time point determining unit 250, a paging transmission carrier determining unit 255, and a paging receiver 260.

The idle mode information allocation receiver 210 receives the deregistration identifier (DID), the paging cycle, the paging offset, and the paging group identifier from the base station 100.

The interested MBS information transmitter 215 informs the base station 100 of a part or all of information on an interested MBS that is being received or is scheduled to be received, and information on a transmission carrier for an interested MBS that is being received or is scheduled to be received.

The MBS receiver 220 receives a part or all of the plurality of MBSs transmitted from the base station 100.

The paging group information transmission time point receiver 225 receives information on the transmission time point determined for the paging group information message from the base station 100.

The paging group information transmission time point determining unit 230 determines a transmission time point for the paging group information message.

The paging group information transmission carrier determining unit 235 determines a transmission carrier for the paging group information message.

The paging group information receiver 240 receives the paging group information message through the determined transmission carrier at the determined transmission time point.

The paging transmission time point receiver 245 receives information on the transmission time point determined for the paging message from the base station 100.

The paging transmission time point determining unit 250 determines a transmission time point for the paging message.

The paging transmission carrier determining unit 255 determines a transmission carrier for the paging message.

The paging receiver 260 receives the paging message through the determined transmission carrier at the determined transmission time point.

The above-mentioned embodiments of the present invention are not embodied only by an apparatus and method. Alternatively, the above-mentioned embodiments may be embodied by a program performing functions that correspond to the configuration of the embodiments of the present invention, or a recording medium on which the program is recorded.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method for a base station supporting multicarrier operation to transmit a paging message, the method comprising:
    determining a first time point for transmitting multicast broadcast service (MBS)-related information;
    transmitting the MBS-related information through a first carrier at the first time point;
    determining a second time point for transmitting a paging message;
    determining a second carrier for transmitting the paging message to a mobile station;
    transmitting the paging message through the second carrier at the second time point;
    determining a third time point for transmitting a paging group information message;
    determining a third carrier for transmitting the paging group information message; and
    transmitting the paging group information message through the third carrier at the third time point,
    wherein the second time point is different from the first time point, and the third time point is different from the first time point.

2. The method of claim 1, wherein the determining of a second carrier comprises
    determining the first carrier as the second carrier when the mobile station receives the MBS-related information.

3. The method of claim 2, wherein the determining of a second time point comprises
    determining a predetermined and fixed time point as the second time point when the mobile station receives the MBS-related information.

4. The method of claim 3, wherein the determining of a second carrier further comprises
    determining the second carrier based on a deregistration identifier allocated to the mobile station and a number of paging carriers included in a paging group allocated to the mobile station when the mobile station does not receive the MBS-related information, and
    the determining of a second time point further comprises
    determining a superframe number based on a paging cycle allocated to the mobile station and a paging offset allocated to the mobile station when the mobile station does not receive the MBS-related information,
    determining a frame number based on the deregistration identifier allocated to the mobile station and a time domain hash parameter allocated to the mobile station, and
    determining the second time point based on the superframe number and the frame number.

5. The method of claim 4, wherein the first carrier corresponds to an MBS dedicated carrier, and the MBS dedicated carrier is divided into a multicast region corresponding to the first time point and a unicast region corresponding to the second time point.

6. The method of claim 2, wherein the determining of a second time point comprises determining a time point as the second time point when the mobile station receives the MBS-related information, and wherein the method further comprises transmitting information on the second time point to the mobile station.

7. The method of claim 1, wherein the determining of a third carrier comprises determining the first carrier as the third carrier when the mobile station receives the MBS-related information, and the determining of a third time point comprises determining the second time point as the third time point when the mobile station receives the MBS-related information.

8. A method for receiving a paging message by a mobile station supporting multicarrier operation, the method comprising:

receiving multicast broadcast service (MBS)-related information at a first time point of a first carrier;

determining a second time point for receiving a paging message;

determining a second carrier for receiving the paging message; and receiving the paging message through the second carrier at the second time point, wherein the second time point is different from the first time point, and wherein the first carrier corresponds to a MBS dedicated carrier, and the MBS dedicated carrier is divided into a multicast region corresponding to the first time point and a unicast region corresponding to the second time point.

9. The method of claim 8, wherein the determining of a second carrier comprises determining the first carrier as the second carrier when the mobile station receives the MBS-related information.

10. The method of claim 8, wherein the determining of a second time point comprises:

determining a paging listening interval based on a paging cycle allocated to the mobile station and a paging offset allocated to the mobile station when the mobile station does not receive the MBS-related information; and determining an interval of the unicast region as the second time point, wherein the receiving of a paging message comprises receiving the paging message after waiting the interval of the unicast region when the paging listening interval is identical to the interval of the unicast region.

11. The method of claim 10, wherein the determining of a second carrier further comprises determining the second carrier based on a deregistration identifier allocated to the mobile station and a number of paging carriers included in a paging group allocated to the mobile station when the mobile station does not receive the MBS-related information, and wherein the determining of a second time point comprises determining a superframe number based on a paging cycle allocated to the mobile station and a paging offset allocated to the mobile station when the mobile station does not receive the MBS-related information, determining a frame number based on the deregistration identifier allocated to the mobile station and a time domain hash parameter allocated to the mobile station, and determining the second time point based on the superframe number and the frame number.

12. A method for a base station to transmit a paging message, the method comprising:

allocating a paging group to a mobile station;

selecting one among a plurality of paging carriers included in the paging group allocated to the mobile station as a paging transmission carrier for the mobile station based on a number of the plurality of paging carriers included in the paging group allocated to the mobile station when the mobile station does not receive an MBS;

selecting an MBS receiving carrier for the mobile station as the paging transmission carrier for the mobile station when the mobile station receives an MBS; and transmitting the paging message through the paging transmission carrier.

13. The method of claim 12, further comprising allocating a deregistration identifier to the mobile station, wherein the selecting of one among a plurality of paging carriers comprises selecting one among the plurality of paging carriers included in the paging group allocated to the mobile station as the paging transmission carrier for the mobile station based on the deregistration identifier allocated to the mobile station, and the selecting of an MBS receiving carrier for the mobile station comprising selecting the MBS receiving carrier for the mobile station as the paging transmission carrier for the mobile station without considering the number of the plurality of paging carriers included to the paging group allocated to the mobile station and the deregistration identifier allocated to the mobile station.

14. The method of claim 13, wherein the selecting of one among a plurality of paging carriers comprises selecting one among the plurality of paging carriers included in the paging group allocated to the mobile station as the paging transmission carrier for the mobile station based on a remainder obtained by dividing the deregistration identifier allocated to the mobile station by the number of the plurality of paging carriers included to the paging group allocated to the mobile station.

15. The method of claim 12, further comprising transmitting a control message including information on a number of paging carriers for each of a plurality of paging groups to the mobile station.

16. A method for a mobile station to receive a paging message, the method comprising:

receiving information on a paging group from a base station;

selecting one among a plurality of paging carriers included in a paging group allocated to the mobile station as a paging transmission carrier for the mobile station based on a number of the plurality of paging carriers included in the paging group when the mobile station does not receive a multicast broadcast service (MBS);

selecting an MBS receiving carrier for the mobile station as the paging transmission carrier for the mobile station when the mobile station receives a MBS; and monitoring the paging message through the paging transmission carrier.

17. The method of claim 16, further comprising receiving allocating information on a deregistration identifier from the base station, wherein the selecting of one among a plurality of paging carriers comprises selecting one among the plurality of paging carriers included in the paging group allocated to the mobile station as the paging transmission carrier for the mobile station based on the deregistration identifier allocated to the mobile station, and the selecting of an MBS receiving carrier for the mobile station comprises selecting the MBS receiving carrier for the mobile station as the paging transmission carrier for the mobile station without considering the number of the plurality of paging carriers included in the paging group allocated to the mobile station and the deregistration identifier allocated to the mobile station.

18. The method of claim 17, wherein the selecting of one among a plurality of paging carriers comprises selecting one among the plurality of paging carriers included in the paging group allocated to the mobile station as the paging transmission carrier for the mobile station based on a remainder obtained by dividing the deregistration identifier allocated to the mobile station by the number of the plurality of paging carriers included to the paging group allocated to the mobile station.

19. The method of claim 16, further comprising
receiving a control message including information on a number of paging carriers for each of a plurality of paging groups from the base station.

* * * * *